Dec. 13, 1949 W. H. GRASSER 2,491,106
PORTABLE POWER OPERATED ROTARY
TAPER CUTTING DEVICE
Filed Jan. 25, 1946 2 Sheets-Sheet 1

*INVENTOR.*
WALTER H. GRASSER
BY *Victor J. Evans & Co.*
ATTORNEYS

Dec. 13, 1949 W. H. GRASSER 2,491,106
PORTABLE POWER OPERATED ROTARY
TAPER CUTTING DEVICE
Filed Jan. 25, 1946 2 Sheets-Sheet 2

*INVENTOR.*
WALTER H. GRASSER

ATTORNEYS

Patented Dec. 13, 1949

2,491,106

UNITED STATES PATENT OFFICE 2,491,106

PORTABLE POWER-OPERATED ROTARY TAPER CUTTING DEVICE

Walter H. Grasser, Wichita, Kans.

Application January 25, 1946, Serial No. 643,425

1 Claim. (Cl. 144—125)

This invention relates to a portable jointer which is especially adapted to be used in connection with airplane repairs and other similar uses.

The device will be used extensively in connection with repairs to the wood spars of airplane wings which have been damaged. The Civil Aeronautics Administration governing approved repairs to all certified aircraft, states that wood spars that have been broken or damaged may be repaired by splicing and gluing in a new spar section.

This new spar section may be either from the break inboard or from the break outboard. The important point is, that the taper of the splice be a minimum of ten to one, or for a one inch thick spar the taper cut will be ten inches long.

Obviously, that portion of the spar which remains in the wing will have to be tapered by hand methods which usually take the better part of a day. First the wing must be removed so as not to have to work overhead. The ragged portion at the break must then be cut off and all the ribs removed from the portion to be replaced. Then by means of saw, plane and scraper the ten to one taper is made as accurately as possible by hand. No sandpaper can be used since it is in conflict with good gluing practice.

The mating taper is then made on the mating portion of the replacement spar section. This is either done in the same manner by hand in the small shop, or by trial and error on a jointer, since the taper angle of the cut will have to be such that when in contact with the mating part, the spar will be perfectly straight. It is quite a lengthy process to shape by hand, the mating parts of a spar splice as well as a difficult one. An operation of this sort can only be handled by highly skilled workmen.

It is an object of the invention therefore to provide a device which will quickly and accurately cut a smooth accurate ten to one taper on both mating portions of a spar splice.

Another object of the invention is to provide a device that is self-contained, portable, fixed in adjustment, requires no prior figuring or setting, cannot get out of adjustment, presents no maintenance problem and has low operating and initial cost.

The device will prove an asset in every airplane repair shop. It can be operated by other than mechanics or skilled operators, since it can be installed and operated by the most inexperienced workman with the same accurate precise results. Since the device can be operated in any position it is not necessary to remove the wing from the aircraft to make the splice.

With the foregoing and other objects and advantages in view the invention consists of the novel details of construction, arrangement and combination of parts more fully hereinafter described, claimed and illustrated in the accompanying drawings in which:

Figure 1:
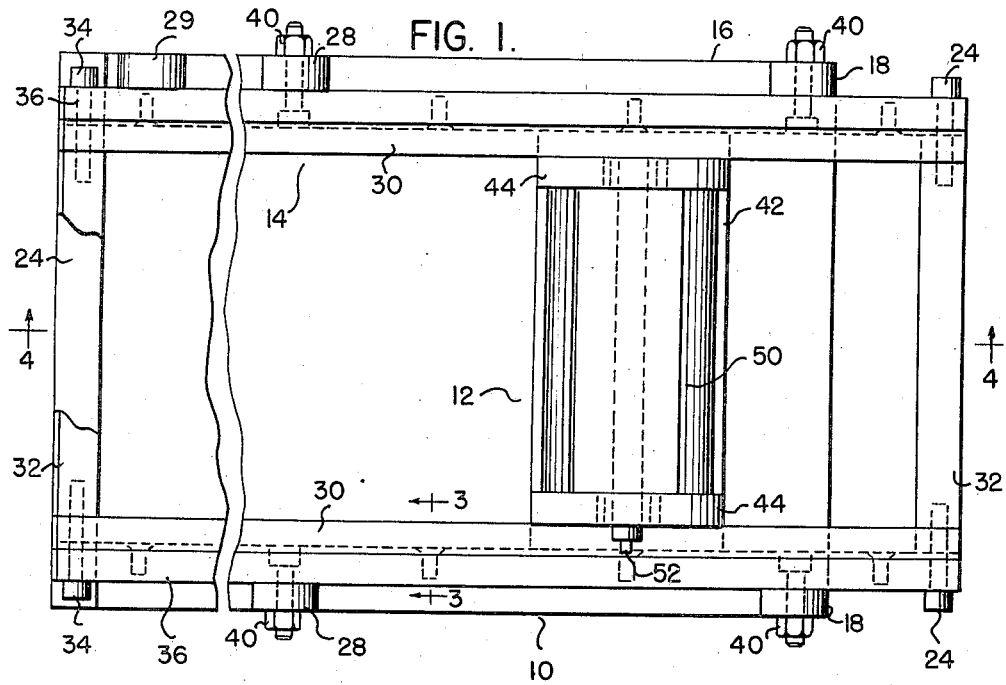
Figure 1 is a top plan view of an embodiment of the invention.
Figure 2:
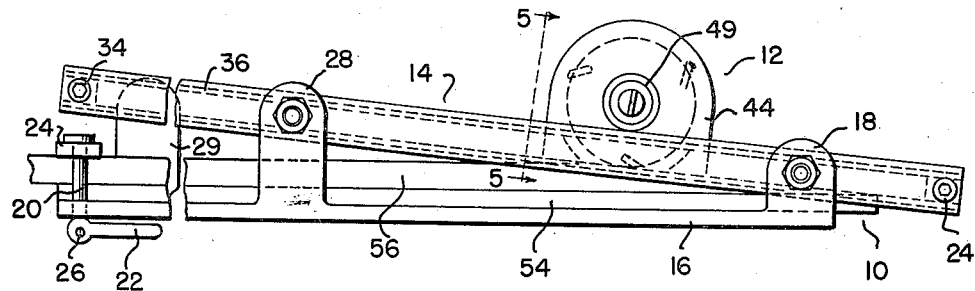
Figure 2 is a side view thereof.
Figure 3:
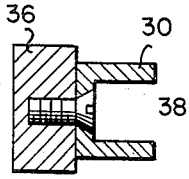
Figure 3 is a sectional view on the line 3—3 of Figure 1.

Referring more in detail to the drawings the reference numeral 10 designates the jointer which comprises the three major parts consisting of the sliding carriage 12 the carriage support frame 14 and the base plate 16.

The base plate 16 is rectangular in shape and made of steel or any other suitable material. At one end of the base plate 16 there are provided oppositely positioned upright lugs 18 which are formed on the longitudinal edge of the base and are apertured at the upper end thereof. The opposite end of the base plate 16 is apertured adjacent the opposite corners thereof to receive studs 20, having cam action, levers 22 pivotally mounted thereon. The studs 20 extend through the base plate 16 to be received in the clamping bar 24 which extends transversely of the base plate 16. The studs have a shrink fit in the clamping bar and the studs are threaded to receive the pivot pin 26 of the levers 22.

Spaced from the clamping bar 24 and formed on the longitudinal edge of the base plate 16 are a second pair of opposed upright lugs 28 which are parallel to but of a greater height than the lugs 18, the lugs 28 are also apertured at the upper end thereof.

The base plate can have lightening holes bored through its entire surface or might be die cast from "Zamac" or any other suitable metal in the interests of weight saving.

Formed on the base plate 16 intermediate the clamping bar 24 and the upright lug 28 on the left longitudinal edge of the plate is the upright guide lug 29 which is parallel to the lugs on the left side and of approximately the same height as the upright lug 28, as many clamping bars and guide lugs may be used as desired but the guide lugs may vary in height as desired.

The carriage support frame 14, comprises the opposed channel shaped sides 30 and the end strips 32 joined to the ends of the sides by bolts 24 and 34. To further strengthen the sides 30, strips of metal 36 of a larger size are secured to the sides 30 by bolts 38. The bolts 24 and 34 pass through the sides 30 and strips 36 to join the ends thereto in unit assembly. Thus the carriage support is easy to construct, is relatively inexpensive and is rigid.

The carriage support frame 14 is secured to the upright lugs by means of Allen screws 40 which pass through apertures spaced from the outer ends of the frame.

The sliding carriage 12 consists of a steel plate 42 extending across the base plate 16 and received in the sides 30 thus there is provided a support as well as a track for the plate to follow. The steel end strips 32 secured in the channelled sides 30 serve as limiting stops for the travel of the plate 42 in the sides 30 thus the plate can be moved from one end of the frame 14 to the other limited in its movement only at the extreme ends thereof.

Formed on the steel plate 42 in spaced relation to the ends thereof are the upright rotor supports 44. Supports are formed on the plate so that the sides of the supports contact for sliding motion, the sides 30 of the frame 14. The rotor is provided with a shaft 48 which is journalled in ball bearing race 49 mounted in the supports 44 and the rotor is provided with three angularly related and relatively spaced cutter blades 50 or a rotor with a spiral cutter may be used and the plate is cut-out at 51 to permit the cutter blades 50 to extend therethrough for contact with work placed on the base plate 16. The right end of the shaft 48 may be provided with a tang 52 for engagement with a slot in the drive shaft of an electric motor, not shown which is mounted on the right side of the sliding carriage 12. A sheet metal guard over the rotor can also be connected to the rotor supports 44 for safety. The sliding carriage as well as the base plate may also be die cast with a view of saving weight, and the guide lugs previously described serve to align the spar on the jointer.

With the carriage support frame bolted to the base the lugs are so arranged in height that the frame assumes a six degree angle between the frame and base and since this angle is fixed it automatically maintains a ten to one setting at all times. If a wood backing plate is used under the spar when it is cut the taper can be continued into the backing plate to form a feather edge on the spar.

Since the six degree angle is fixed to give a ten to one taper cut at all times, spars of various thicknesses are accommodated by the device and the scarf cut in the spar will vary in length but still remain at a six degree angle.

Figure 4:
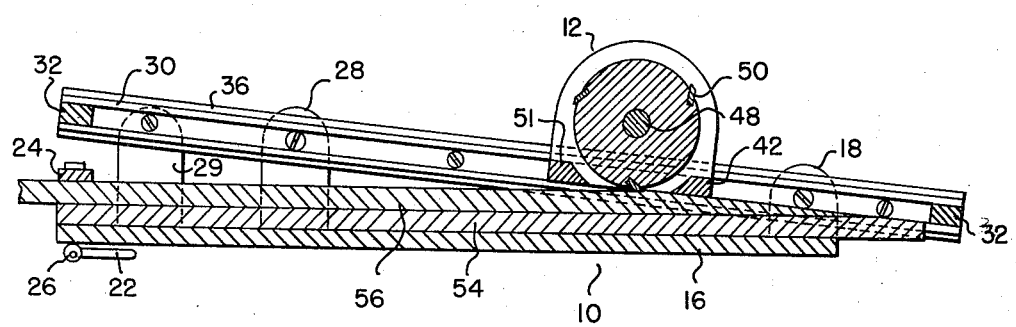
Figure 4 is a sectional view on the line 4—4 of Figure 1.
Figure 5:
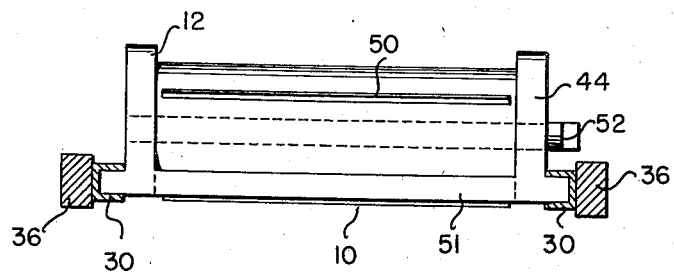
Figure 5 is a sectional view on the line 5—5 of Figure 2.

When an airplane having a broken front spar is to be repaired and the break is better than the half way portion outboard from the root rib, the wing need not be removed from the airplane. The covering the wing is removed from the break outboard. The ribs are removed from the break outboard, brace wires are removed and the ragged edges on the broken front spar are sawed straight. An approximate ten to one scarf is laid out and roughly sawed through. If the spar is one inch thick by six inches wide a wood strip approximately two and one half inches in width is placed along the edge of the spar so as to bring the spar approximately in the center of the base plate, and rotor. The device is placed on the spar a backing plate is inserted between the spar and base plate and the clamps brought into contact with the spar. The pins of the cam levers are threaded upwardly till contact is made with the bottom of the base plate at which time the levers are pressed against the bottom of the base plate, the cam action thereof giving a firm grip on the clamps. Then with the backing plate 54 in place under the spar 56 as shown in Figure 4 and the spar is centered the carriage is moved to the highest point in the support frame and the motor started and by pushing it downward against the spar the ten to one taper is cut and extending into the backing plate forms a feather edge on the spar.

The piece of lumber for the remainder of the spar can be tapered on a nearby bench by this same device and the tapers being fixed they will perfectly match and form an accurate scarf.

It is believed that the operation and construction of the device will be apparent to those skilled in the art and it is to be understood that changes in the details of construction, arrangement and combination of parts may be resorted to without departing from the spirit of the invention and the scope of the appended claim.

Having thus described the invention what is claimed as new and desired to be secured by Letters Patent is:

A device of the character described, comprising a rectangular shaped base plate, an upstanding lug formed at one end of each of the longitudinal edges of said base plate, an upstanding lug formed on each of the longitudinal edges of said base plate intermediate the ends of said base plate, a carriage support fixed to said lugs, said carriage support having inwardly facing channel sides, the lugs spaced inwardly of the ends of said base plate being of a height to give said carriage an inclination with relation to said base, a movable carriage mounted in the channelled sides of said carriage support, upstanding lugs on said movable carriage, a rotary cutter mounted on a shaft journalled in said lugs, means in the channelled sides of said carriage support to limit the movement of said movable carriage, a guide lug on one longitudinal edge of said base adjacent the other end thereof, and clamping means on the end of the base adjacent the guide lug for holding the work on said base that is adapted to be cut by the rotary cutter on said movable carriage.

WALTER H. GRASSER.

REFERENCES CITED

The following references are of record in the file of this patent:

UNITED STATES PATENTS

| Number | Name | Date |
|---|---|---|
| 169,414 | Carmany | Nov. 2, 1875 |
| 1,115,995 | Willson | Nov. 3, 1914 |
| 1,306,249 | Cobb et al. | June 10, 1919 |
| 1,580,155 | Niestradt | Apr. 13, 1926 |
| 1,800,521 | Girrbach | Apr. 14, 1931 |